United States Patent
Gambino (10) Patent No.: US 8,954,994 B2
(45) Date of Patent: *Feb. 10, 2015

(54) SYSTEM AND METHOD FOR MESSAGE SERVICE WITH UNIT-OF-ORDER

(75) Inventor: Salvatore Anthony Gambino, Ringoes, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1665 days.

This patent is subject to a terminal disclaimer.

(21) Appl. No.: 12/107,597

(22) Filed: Apr. 22, 2008

(65) Prior Publication Data

US 2008/0263564 A1 Oct. 23, 2008

Related U.S. Application Data

(60) Provisional application No. 60/913,518, filed on Apr. 23, 2007.

(51) Int. Cl.
*G06F 9/54* (2006.01)
*G06F 9/52* (2006.01)

(52) U.S. Cl.
CPC *G06F 9/52* (2013.01); *G06F 9/546* (2013.01); *G06F 2209/548* (2013.01)
USPC .......................................... 719/314; 709/227

(58) Field of Classification Search
CPC ...... G06F 9/52; G06F 9/546; G06F 2209/548
See application file for complete search history.

(56) References Cited

U.S. PATENT DOCUMENTS

| 7,509,378 | B2* | 3/2009 | Goland | 709/206 |
| 2003/0110230 | A1* | 6/2003 | Holdsworth et al. | 709/207 |
| 2006/0146848 | A1* | 7/2006 | Kirstein et al. | 370/412 |
| 2006/0161925 | A1* | 7/2006 | Aikens et al. | 719/313 |
| 2006/0177069 | A1* | 8/2006 | Critchley et al. | 380/283 |

OTHER PUBLICATIONS

David Currie, Grouping messages using the WebSphere MQ Java and JMS APIs, Feb. 15, 2006, pp. 1-9.*
Appache ActionMQ, Message Groups, 2004, pp. 1-3.*
Jon Mountjoy, WebLogic: The definitive guide, Feb. 23, 2004, O'Reilly Media, Inc, Chapter 8.5.2—Chapter 8.5.2.5.*

* cited by examiner

*Primary Examiner* — H S Sough
*Assistant Examiner* — Syed Roni
(74) *Attorney, Agent, or Firm* — Meyer IP Law Group (57) ABSTRACT

The present invention enables "unit-of-order", which allows a message producer to group messages into a single unit. It guarantees that messages are not only delivered to consumers in order, they are also are processed in order. The unit-of-order will be delivered to consumers as one unit and only one consumer will process messages from the unit at a time. The processing of a single message is complete when it is acknowledged, committed, recovered, or rolled back. Until message processing for a message is complete, the remaining unprocessed messages for that unit-of-order are blocked.

20 Claims, 5 Drawing Sheets

SYSTEM AND METHOD FOR MESSAGE SERVICE WITH UNIT-OF-ORDER

CLAIM OF PRIORITY

This application claims priority from the following application, which is hereby incorporated by reference in its entirety:

U.S. Provisional Application No. 60/913,518, entitled SYSTEM AND METHOD FOR MESSAGE SERVICE WITH UNIT-OF-ORDER, by Sal Gambino, filed on Apr. 23, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of ordered message delivery and processing.

BACKGROUND

A messaging service, for a non-limiting example, Java® Messaging Service (JMS), is an application program interface (API) that supports the formal communication known as messaging between computers in a network. Here, messaging is the creation, storage, exchange, and management of messages between producers who send/publish the messages to a queue of a destination and consumers who receive, subscribe, and browse the messages from the queue of the destination. Here, a message can be but are not limited to, text, image, voice, telex, fax, e-mail, paging, and other suitable electronic data describing events, requests, and replies over a communications network. A distributed destination is a set of destinations (queues or topics) that are accessible as a single, logical destination to a client. The destinations can be hosted on a messaging server.

The JMS specification specifies ordered message delivery in a very strict sense by defining order between a single instance of a producer and a single instance of a consumer. It does not take into account that there may be multiple producers within a single application acting as a single producer. The case where there are multiple consumers acting in concert is even more common. Moreover, when consumers reject messages (recover or transaction rollback), other messages from the same producer can be delivered to another consumer for processing.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable "unit-of-order", which allows a stand-alone message producer, or a group of producers acting as one, to group messages into a single unit. It guarantees that messages are not only delivered to consumers in order, they are also are processed by the consumers in order. The unit-of-order is delivered to consumers as one unit and only one consumer can process messages from the unit at a time (no parallel delivery). Messages of a unit-of-order sent to a distributed destination are on physical member of the distributed destination only one at a time, i.e., the messages will not reside at more than one member at any given time. The only mandatory property of the feature is ordered processing, which requires that messages from a unit-of-order can only be processed sequentially in the order they were created. The processing of a single message is complete when it is acknowledged, committed, recovered, or rolled back. Until message processing for a message is complete, the remaining unprocessed messages for that unit-of-order are blocked.

The current JMS specification, however, cannot guarantee ordered message processing due to these reasons:

1. While a consumer is processing one message from a queue, the next message is delivered to another consumer for processing. This results in parallel processing of the messages. Both messages may be sent by the same producer and ordered processing rule is violated.
2. While a message $M_i$ is delivered as part of a transaction, the next message $M_{i+1}$ is delivered outside of this transaction. $M_{i+1}$ is then acknowledged. If the transaction rolls back, $M_i$ will be redelivered to the Queue and be processed after $M_{i+1}$.
3. Processing order of messages is different from arrival order when:
   a) The Queue has sorting criteria (such as priority).
   b) If there are multiple consumers on the Queue and one of them does recover/rollback, less recent messages may be processed by other consumers before these messages are redelivered.

The problem can be further illustrated by the following case study of online book purchase.

An online bookstore implements a simple processing design that uses JMS to process customer orders. The JMS processing system is composed of:

A message producer sending to a queue (Queue 1).
Multiple consumers—message driven beans (MDBs), such as MdbX and MdbY, that process messages from Queue1.
A database (myDB) that contains order and order status information.

A client logs into the online bookstore account and searches his favorite book topics. He chooses a book, proceeds to the checkout, and completes the sales transaction.

Then the client realizes he has previously purchased this same item, so he cancels the order. One week later, the book is delivered to him.

Figure 1:
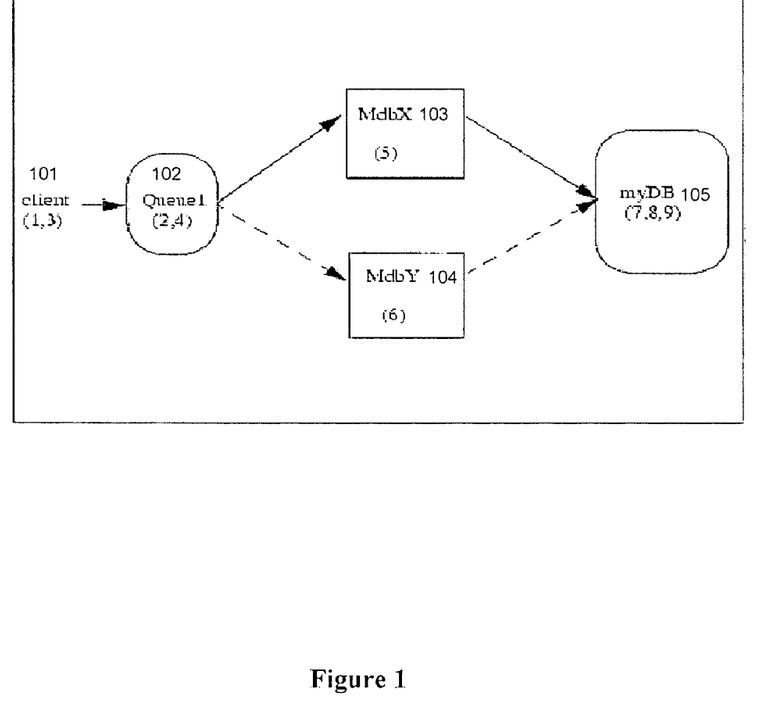
FIG. 1 is an illustration of an exemplary order processing sequence without unit-of-order.

In the client's ordering scenario, his cancel order message was processed before his purchase order message. Consequently, he received a book he did not wish to purchase. The following steps and the diagram shown in FIG. 1 demonstrate how the client's order was processed:

1. The client 101 clicks the order button from his shopping cart.
2. The order message (message A) is placed on Queue1 102.
3. The client cancels the order.
4. The cancel order (message B) is placed on Queue1.
5. MdbX 103 takes message A from Queue1.
6. MdbY 104 takes message B from Queue1.
7. MdbY writes the cancel message to the database myDB 105. Because there is no corresponding order message, there is no order message to remove from the database.
8. MdbX writes the order message to the database.
9. An application responsible for shipping books reads the database, sees the order message, and initiates shipment to the client.

In addition, although the Java Message Service Specification provides an ordered message delivery, it only provides ordered message delivery between a single instance of a producer and a single instance of a consumer. In the case above, multiple MDBs where available to consume messages from Queue1 and the processing order of the messages was no longer guaranteed.

Figure 2:
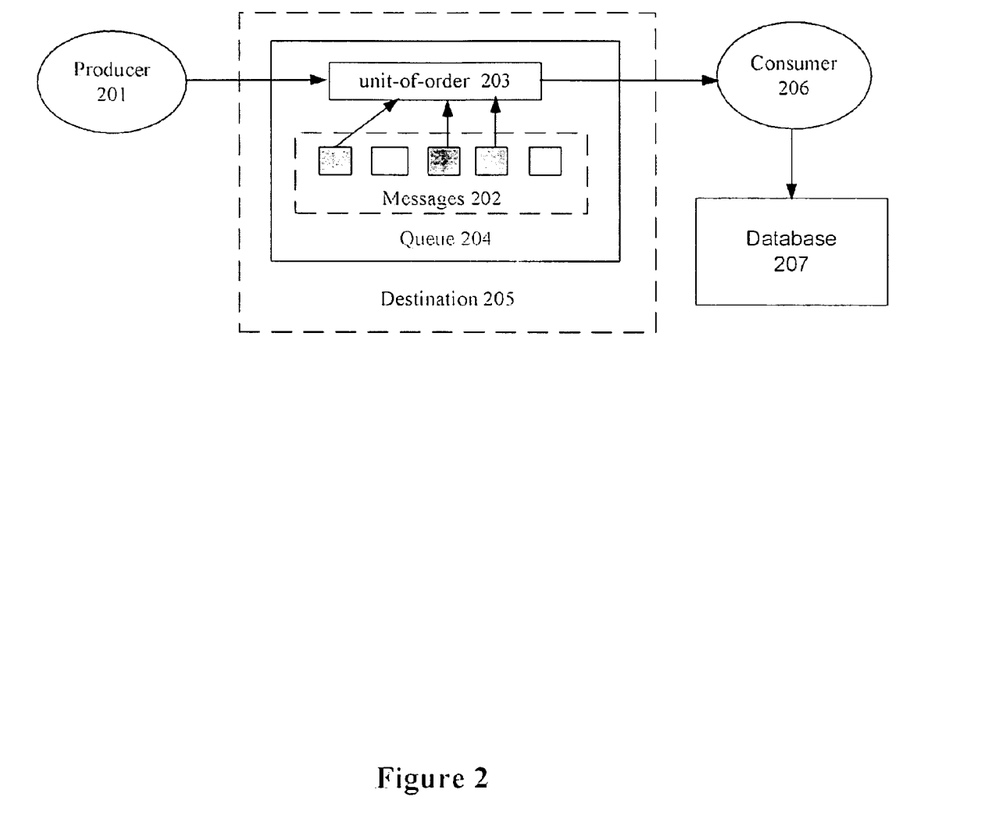
FIG. 2 is an illustration of an exemplary system for messaging service based on unit-of-order in one embodiment of the present invention.

FIG. 2 is an illustration of an exemplary system for messaging service based on unit-of-order in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 2, a producer 201 can create a plurality of messages 202 in order, sorted by, for non-limiting examples, time and/or priority. These messages can then be grouped together as a single unit-of-order 203, and be delivered as a unit to a queue 204 on a destination 205. If the destination is a distributed destination, the unit-of-order will be delivered to a single member of the distributed destination. A consumer 206, for a non-limiting example, a Message Driven Bean, can then process the messages in the unit-of-order sequentially in the order they are created one at a time. Any unprocessed messages in the unit-of-order will be blocked until the processing of the current message is completed. Finally, the processing result of the messages can be saved into a database 207.

Figure 3:
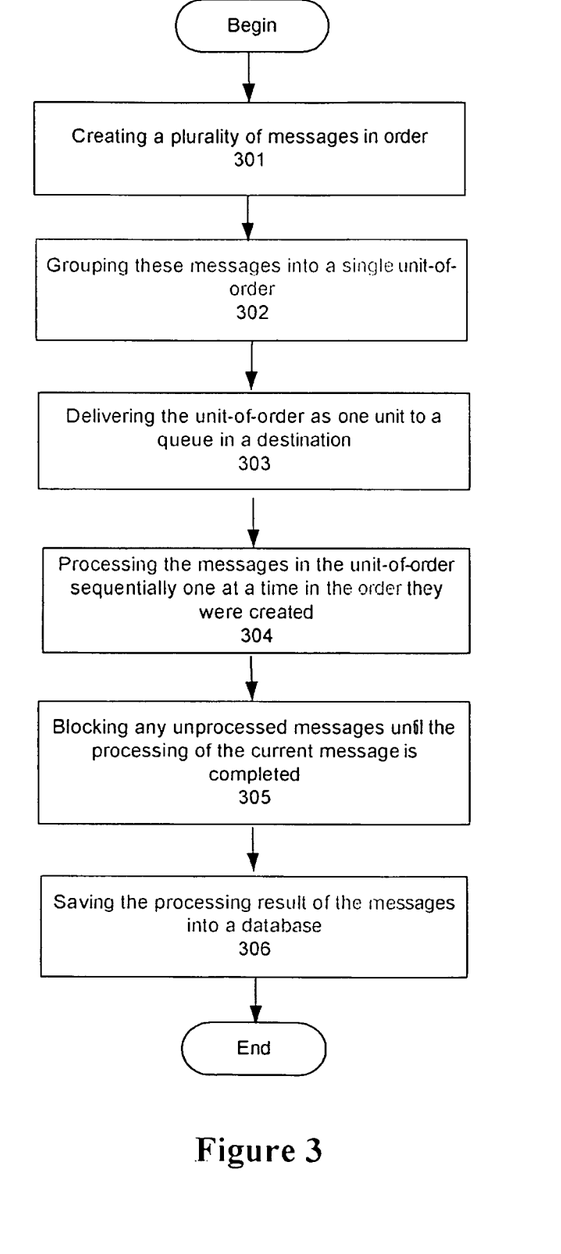
FIG. 3 is a flow chart illustrating an exemplary process for messaging service based on unit-of-order in accordance with one embodiment of the invention.

FIG. 3 is a flow chart illustrating an exemplary process for messaging service based on unit-of-order in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, a plurality of messages can be created in order at step 301. These messages can then be grouped a single unit-of-order at step 302 and delivered as one unit to a queue in a destination at step 303. Once delivered, the messages in the unit-of-order will be processed sequentially one at a time in the order they were created at step 304 and any unprocessed messages will be blocked until the processing of the current message is completed at step 305. The processing result of the messages can be saved into a database at step 306.

The simple case study depicted in FIG. 1 can again be used to illustrate how message unit-of-order can solve the problem previously discussed. To ensure that all messages in Joe's order are processed correctly, the system administrator for XYZ Bookstore can configure a message unit-of-order based on a user session, such that all messages from a user session have a unit-of-order name attribute with the value of the session id. All messages created during Joe's user session are processed sequentially in the order they were created because messages in a Unit-of-Order are not processed in parallel. The diagram in FIG. 4 and corresponding actions below demonstrate how the client's order was processed using message unit-of-order.

Figure 4:
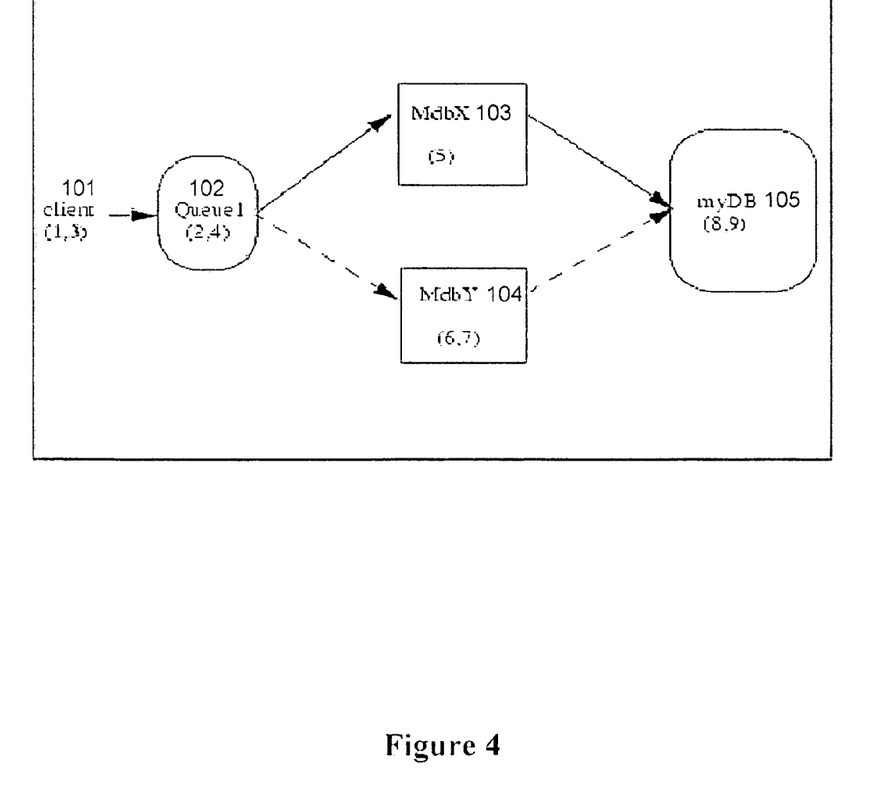
FIG. 4 is an illustration of an exemplary an exemplary order processing sequence with unit-of-order in one embodiment of the present invention.

1. The client 101 clicks the order button from his shopping cart.
2. The order message (message A) is placed on Queue1 102.
3. The client cancels the order.
4. The cancel order (message B) is placed on Queue1.
5. MdbX 103 takes message A from Queue1.
6. MdbY 104 takes message B from Queue1.
7. Message B on MdbY is blocked until MdbX acknowledges the order message.
8. Message A is committed and written to the database myDB 105.
9. Message B is committed and written to the database myDB 105.

Because there is a corresponding order message, Joe's order is removed from the database and he does not receive a book.

Figure 5:
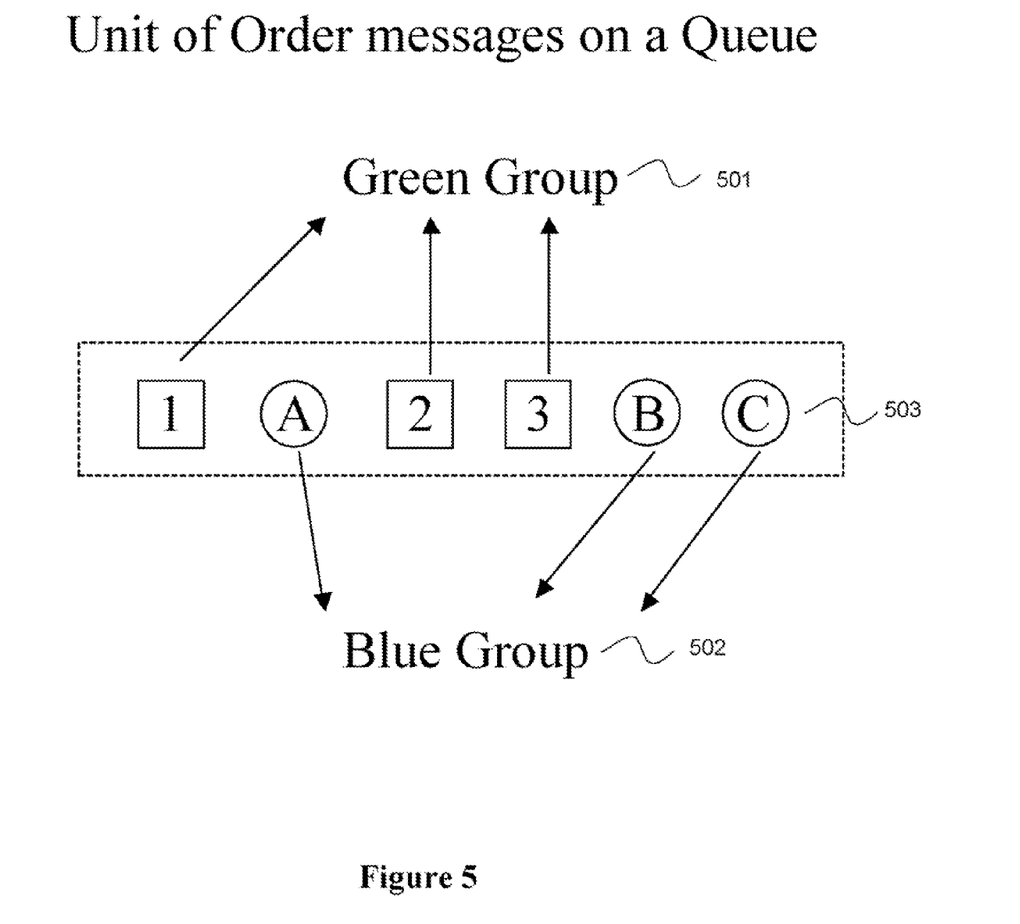
FIG. 5 is an exemplary illustration of multiple unit-of-orders residing on the same queue in one embodiment of the present invention.

In some embodiments, messages on the same queue can belong to different unit-of-orders as shown in FIG. 5. "Green Group" (messages 1, 2, and 3) 501 and "Blue Group" (messages A, B, and C) 502 are on the same queue 503, but they are two different unit-of-orders can are processed by different transactions or session one at a time, respectively.

Message Delivery with Unit-of-Order

In some embodiments, unit-of-order requires that messages to be delivered in accordance with the following rules:

Member messages of a unit-of-order can be delivered to queue consumers sequentially in the order they were created. The message order within a unit-of-order will not be affected by sort criteria, priority, or filters. However, messages that are uncommitted, have a Redelivery Delay, or have an unexpired Time-to-Deliver timer will delay messages that arrive after them.

Unit-of-order messages can be processed one at a time. The processing completion of one message allows the next message in the unit-of-order to be delivered.

Unit-of-order messages sent to a distributed destination (queue) can reside on only one physical member of the distributed queue.

All uncommitted or unacknowledged messages from the same unit-of-order must be in the same transaction. When one message in the unit-of-order is uncommitted or unacknowledged, the other messages are deliverable only to the same transaction or session. This keeps all unacknowledged messages from the same unit-of-order in one recoverable operation and allows order to be maintained despite rollbacks or recoveries.

A queue that has several messages from the same unit-of-order must complete processing all of them before they can be delivered to any queue consumer or the next message can be delivered to the queue.

As non-limiting examples, when messages M1 through Mn are delivered:

As part of a transaction and the transaction is rolled back (processing is complete), messages M1 through Mn are delivered to any available consumer.

outside of a transaction and the messages are recovered (processing is complete), messages M1 through Mn are delivered to any available consumer.

outside of a transaction and the messages are acknowledged (processing is complete), the undelivered message Mn+1 is delivered to any available consumer.

In some embodiments, some messages are not ready for delivery yet by a unit of order, including:

messages within uncommitted transactions.

messages kept from being delivered until the TimeToDeliver (i.e., birth time) interval has elapsed.

messages kept from being redelivered until the Redelivery-Delay interval has elapsed when a consumer that has called recover or rollback.

For a non-limiting example, messages A and B arrive in that order in the same unit of order, and A cannot be delivered for any of the reasons listed above. Even though message B does not have anything that delays its delivery, it is not deliverable until all prior messages in its unit-of-order have been delivered.

In some embodiments, destination sort keys control the order in which messages are presented to consumers when messages are not part of a unit-of-order or are not part of the same unit-of-order. For a non-limiting example, messages A and B are in the same unit-of-order on a queue that is sorted by priority and the sort order is descending, where message B has a higher priority than A. Even though message B has a higher priority, it is still not deliverable until message A has been processed because they are in the same unit-of-order. If a message C arrives and either does not have a unit-of-order or is not in the same unit-of-order as message A, the priority setting of message C and the priority setting of message A will determine the delivery order.

Message Processing with Unit-of-Order

In some embodiments, the ordered processing feature guarantees that messages with the same unit-of-order name within a single destination are processed in the order they arrive at the queue. This is a stronger guarantee than the ordered delivery guarantees defined by the JMS specification. To guarantee ordered processing, delivery of messages in the same unit-of-order to consumers at a destination can be controlled in the following way:

a) All messages of a unit-of-order are delivered in the order they arrive. The message order within a unit-of-order will not be affected by sort criteria, priority, and so on. Uncommitted messages and unborn messages will delay messages that arrive after them.

b) All unacknowledged messages from the same unit-of-order shall be in the same transaction, or if non-transactional, the same session. After one message in the unit-of-order is unacknowledged, the other messages are deliverable only to the same transaction or session. This keeps all unacknowledged messages from the same unit-of-order in one recoverable operation and allows order to be maintained despite rollback or recover.

The ordered processing guarantee is based on rigid acknowledge, recover, commit and rollback rules. The processing completion of one message allows the next message in the unit-of-order to be processed.

In some embodiments, processing a single message in a unit-of-order is complete when it has been: acknowledged, committed, recovered, rolled back, or removed due to expiration or redelivery limit. A consumer that has several messages from the same unit-of-order must complete processing all of them before another can be delivered to any queue consumer if all previous messages have been processed.

When messages $M_1$ through $M_n$ are delivered as part of a transaction, and the transaction is rolled back, processing is completed, and $M_1$ through $M_n$ messages may be delivered to any other consumer.

When $M_1$ through $M_n$ are delivered outside of a transaction, and the messages are recovered, processing is completed, and $M_1$ through $M_n$ messages may be delivered to any other consumer.

When $M_1$ through $M_n$ are delivered outside of a transaction, and the messages are acknowledged, processing is completed, and undelivered message $M_{n+1}$ may be processed by any consumer.

In some embodiments, acknowledgement mode can be defined to indicate whether messages are processed in the unit-of-order. No messages from a unit-of-order are processed in parallel in the acknowledgement mode (when the consumer is closed, the current message processing is completed, regardless of the session's acknowledge mode):

When the consumer is closed, the current message processing is completed, regardless of the session's acknowledge mode.

CLIENT_ACKNOWLEDGE: The application indicates which messages are completely processed in the unit-of-order. No ambiguities exist in the synchronous and asynchronous consumer cases.

AUTO_ACKNOWLEDGE: The session automatically acknowledges a client's receipt of a message when it has either successfully returned from a call to receive or when a message listener called returns successfully.

Asynchronous AUTO_ACKNOWLEDGE: consumers never call acknowledge( ) directly. Instead, successful completion or message exception unambiguously indicates when the message is completely processed from the unit-of-order.

Synchronous AUTO_ACKNOWLEDGE: JMS will define the process of consumerA.receive( ) to be completed when a next event for consumerA, such as consumerA.receive( ), consumerA.setListener( ) or consumerA.close( ), occurs.

DUPS_OK_ACKNOWLEDGE: The session automatically acknowledges a client's receipt of a message when it has either successfully returned from a call to receive or when a message listener that was called returns successfully.

NO_ACKNOWLEDGE: The session provides no order processing guarantees and it never calls recover or acknowledge. Messages can be processed in parallel to different available consumers.

In some embodiments, the unit-of-order feature will not limit parallel processing of the same unit of order by two subscribers on the same topic. The message delivery model for a topic subscriber is the same as that of a queue with exactly one consumer, because individual subscribers for a topic are considered to have their own destination/message list. In case unit of order messages are sent to a distributed topic, the order of the messages on a particular physical member is defined by the order the messages arrive at the member. In another word, the orders of the messages at different members of the distributed topic may be different.

Every unit-of-order has a name. In some embodiments, the messages with equal unit-of-order names belong to the same unit-of-order within a destination. The name can either be provided by the system or the application. Messages in the same unit-of-order all share the same name. System-generated unit of order names can be timestamp-based and statistically unique. This allows the application to have unit of order that are uniquely named.

In some embodiments, applications can also supply their own unit-of-order names. They can be referenced through various mechanisms that allow multiple producers and even multiple clients to share them. Applications will take advantage of Ordered Processing by this name, so it can be significant to the application. Unit-of-order can also have their own namespace and do not need to be unique with respect to other named objects. For instance, it is perfectly valid to have both a unit-of-order named "Foo" and a Queue named "Foo". The scope of a Unit of Order name is limited to a single destination and two different Units of Order on two destinations may have the same name.

In some embodiments, one or more producers may send messages with the same unit-of-order by using the same string to create the unit-of-order. Alternatively, the unit-of-order name may be extracted from a delivered message so that a system-generated unit-of-order name can be used on more than one producer. This sharing paradigm works just as well for application-assigned unit-of-order names. It will be most efficient if the information is serialized in only one place, so a property like Conversation Id may wish to be stored only as the unit-of-order name.

In some embodiments, messages in a unit-of-order can be created programmatically through an Application Programming Interface (API) of the JMS message producer. With this programmatic approach, a method will be called to associate the producer with a unit-of-order name. Once a producer is associated with a unit-of-order, all messages sent by this producer are processed as a unit-of-order until either the producer is closed or the association between the producer and the unit-of-order is dissolved. The following code provides a non-limiting example of how to associate a producer with a unit-of-order:

getProducer( ).setUnitOfOrder("myUOOname");

where the unit-of-order name attribute value is set to myUOOname.

In some embodiments, messages in a unit-of-order can be created demonstratively through a JMS connection factory. With this administrative approach, a factory can be configured with unit-of-order enabled and, optionally, a name provided. As a result, all sessions created from connections created from this factory will have unit-of-order enabled. All messages produced from the same session will belong to the same unit-of-order and messages from different sessions belong to different unit-of-order. The connection factory approach also has the advantage of enabling unit of order for legacy JMS applications without any code change. A connection factory can be configured via one of the following methods to enable message unit-of-order:

Configuring a connection factory to always use a user-generated unit-of-order name. As a result, all producers created from such a connection factory have unit-of-order enabled.

Configuring a connection factory to always use a system-generated unit-of-order name for each session.

Changing the initial connection factory setting on the producer.

Configuring a destination to always use a system-generated unit-of-order name.

A unit-of-order should be configured administratively on a connection factory or destination when interoperating with legacy JMS applications to provide a simple mechanism to ensure messages are processed in the order they are created without making any code changes.

In some embodiments, JMS message management allows a JMS administrator to move and delete most messages in a running JMS server, and thus violating the delivery rules for unit-of-order. For a non-limiting example, if messages A, B, C, and D are produced and sent to destination D1 and belong to unit-of-order foo:

Moving messages C and D to destination D2 may allow parallel processing of messages from both destinations.

Moving messages B and C to destination D2 may allow parallel processing of message A and messages B and C.

After message A is processed, message D is deliverable.

For applications that depend on maintaining message order, a best practice is to move all of the messages in a unit-of-order as a single group and the following steps can be used to ensure unit-of-order delivery rules are maintained:

1. Pause the source destination and the target destination.
2. Select all of the messages with the unit-of-order you would like to move.
3. Move the selected messages to the target destination. If necessary, sort them according to the order that you want them processed.
4. Resume the source and target destinations.

In some embodiments, unit-of-order can be supported by store-and-forward function. For a non-limiting example, a store-and-forward producer sends messages with a unit-of-order named Foo. If the producer disconnects and reconnects through a different connection, the producer creates another unit-of-order with the name Foo and continues sending messages. All messages sent before and after the reconnect are directed through the same store-and-forward agent.

In some embodiments, all messages with the same unit-of-order and having a distributed destination target (such as a queue) can be directed to a single member of the distributed destination to preserve order. For a non-limiting example, all messages of the unit-of-order will be sent to one physical queue member at a time if a message is sent to a distributed queue. If the message is sent directly to a distributed queue member, no routing will be performed:

When the application sends a message directly to a distributed queue member, the application has not asked the system to choose the physical member for the unit-of-order. Rather, the application has directed the messages to a particular member.

If a message is sent directly to a distributed queue member, the (distributed queue, unit-of-order name, physical queue member) path entry is not learned for subsequent sends to the distributed queue.

In some embodiments, the routing of unit-of-order to the destination can be controlled by path service, which stores a map from unit-of-order name to distributed destination member. It makes the routing of unit-of-order transparent to configuration changes and still works if one member is down. However, new unit-of-order messages cannot be sent if path service cannot be reached.

In some embodiments, path service can be configured to provide a persistent map that can store the path information (application names) required to route the messages contained in a unit-of-order to its destination resource—a member of a distributed destination. If the path service is configured for a distributed destination, the routing path to a member destination is determined by the server using the run-time load balancing heuristics for the distributed queue. Path Service can be defined at top level and only one path service is allowed per cluster, which can be shared among multiple entities within a server.

In some embodiments, path service requires configuration by the administrator. When a unit-of-order does not have a path entry, a (distributed queue, unit-of-order name, physical queue member) path entry mapping is created. The path entry is deleted when the last producer and last message reference are deleted. After the path entry is deleted, the same unit-of-order name may be sent to a different distributed queue physical member. The member can be chosen based on run time distributed queue load balancing information, which are persisted. Subsequently, one or more producers can send messages to the same unit-of-order in the same distributed queue sharing the path entry. Eventually no more producers or queue messages are using that unit-of-order name and that path entry can be deleted. Queue members deleted from the distributed queue will have their corresponding routing entries deleted from the path service as well. There can be a path service configured for the cluster and/or for a specific distributed queue. Regardless of whether the path service is configured, the required route for a unit-of-order name may be unreachable, and a producer sending to an unreachable route results in an exception.

In some embodiments, the default routing path to a member destination (queue) can be chosen by the server based on the hashing of the message unit-of-order name and the distributed queue members if path service is not configured. This routing mechanism is scalable with no single point of failure, since routes to a distributed queue member can be calculated quickly and do not require persistent storage in a cluster. On the other hand, the routes in the hash table needs to change if the configuration changes. The following factors can be considered the implementation of unit-of-order in conjunction with Hash-based routing:

- If a distributed queue member has an associated unit-of-order and is removed from the distributed queue, new messages are sent to a different distributed queue member and the messages will not be continuous with older messages.
- If a distributed queue member has an associated unit-of-order and is unreachable, the producer sending the message will throw an exception and the messages are not routed to other distributed queue members. The exception is thrown because the JMS messaging system can not meet the quality-of-service required—only one distributed destination member consumes messages for a particular unit-of-order.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "bean" is used in the embodiments of the systems and methods described above, it will be evident that such concept can be interchangeably used with equivalent concepts such as, class, method, type, interface, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a messaging service, comprising:
one or more microprocessors;
a unit-of-order that groups together a plurality of messages created in an order by a producer, wherein the unit-of-order is associated with a name; and
a distributed queue on a destination running on the one or more microprocessors,
wherein the distributed queue includes a plurality of distributed queue members, and receives the plurality of messages as a unit on a single distributed queue member,
wherein when one of the plurality of messages is determined to be uncommitted, other uncommitted messages in the plurality of messages are delivered to a same transaction as the uncommitted message, so that all the uncommitted messages in the plurality of messages are maintained in a single recoverable operation upon a rollback,
wherein the single distributed queue member is mapped to the name of the unit-of-order via a path service, and
wherein the plurality of messages in the unit-of-order maintain the order that said messages were created, and are adapted to be processed by a consumer of the distributed queue sequentially in that order.

2. The system according to claim 1, further comprising:
a database configured to store a processing result of the plurality of messages in the unit-of-order.

3. The system according to claim 1, wherein the messaging service is objected oriented.

4. The system according to claim 1, wherein each of the producer and the consumer is a software component.

5. The system according to claim 4, wherein the consumer is a Message Driven Bean (MDB).

6. The system according to claim 1, wherein the plurality of messages in the unit-of-order is created either programmatically or administratively.

7. The system according to claim 1, wherein the plurality of messages in the unit-of-order are processed one at a time.

8. The system according to claim 7, wherein each of the plurality of messages in the unit-of-order is completely processed when it is acknowledged, committed, recovered, or rolled back.

9. The system according to claim 7, wherein each unprocessed message in the unit-of-order is blocked until the message being processed is complete.

10. The system according to claim 1, wherein the distributed queue on the destination further includes another plurality of messages in another unit-of-order, wherein each unit-of-order is adaptive to be processed in a different transaction respectively.

11. The system according to claim 1, wherein the plurality of messages in the unit-of-order are processed in parallel by different subscribers of a same topic, wherein each subscriber processes the plurality of messages in a different order.

12. The system according to claim 1, wherein the consumer operates to complete processing the plurality of messages in the unit-of-order before sending another message to the consumer.

13. A method to provide a message service, comprising:
creating, via a producer, a plurality of messages in an order, wherein the plurality of messages are grouped together as a unit-of-order, wherein the unit-of-order is associated with a name; and
delivering the plurality of messages to a distributed queue on a destination as a unit,
wherein the distributed queue, running on one or more microprocessors, includes a plurality of distributed queue members, and receives the plurality of messages on a single distributed queue member,
wherein the single distributed queue member is mapped to the name of the unit-of-order via a path service,
wherein when one of the plurality of messages is determined to be uncommitted, other uncommitted messages in the plurality of messages are delivered to a same transaction as the uncommitted message, so that all the uncommitted messages in the plurality of messages are maintained in a single recoverable operation upon a rollback, and
wherein the plurality of messages in the unit-of-order maintain the order that said messages were created, and are adapted to be processed by a consumer sequentially in that order.

14. The method according to claim 13, further comprising at least one of:
creating the plurality of messages in the unit-of-order either programmatically or administratively, and
storing a processing result of the plurality of messages in the unit-of-order in a database.

15. The method according to claim 13, further comprising:
processing the plurality of messages in the unit-of-order one at a time.

16. The method according to claim 15, further comprising:
blocking each unprocessed message in the unit-of-order until the message being processed is complete.

17. A non-transitory machine readable storage medium having instructions stored thereon that when executed cause a system to perform the steps comprising:
creating, via a producer, a plurality of messages in an order, wherein the plurality of messages are grouped together as a unit-of-order, wherein the unit-of-order is associated with a name; and
delivering the plurality of messages to a distributed queue on a destination as a unit,
wherein the distributed queue, running on one or more microprocessors, includes a plurality of distributed queue members, and receives the plurality of messages on a single distributed queue member,
wherein the single distributed queue member is mapped to the name of the unit-of-order via a path service,
wherein when one of the plurality of messages is determined to be uncommitted, other uncommitted messages in the plurality of messages are delivered to a same transaction as the uncommitted message, so that all the uncommitted messages in the plurality of messages are maintained in a single recoverable operation upon a rollback, and
wherein the plurality of messages in the unit-of-order maintain the order that said messages were created, and are adapted to be processed by a consumer sequentially in that order.

18. The non-transitory machine readable storage medium according to claim 17, further comprising at least one of:
creating the plurality of messages in the unit-of-order either programmatically or administratively.

19. The non-transitory machine readable storage medium according to claim 17, further comprising:
processing the plurality of messages in the unit-of-order one at a time.

20. The non-transitory machine readable storage medium according to claim 19, further comprising:
blocking each unprocessed message in the unit-of-order until the message being processed is complete.

* * * * *

UNITED STATES PATENT AND TRADEMARK OFFICE
CERTIFICATE OF CORRECTION

PATENT NO. : 8,954,994 B2  
APPLICATION NO. : 12/107597  
DATED : February 10, 2015  
INVENTOR(S) : Gambino Page 1 of 1

It is certified that error appears in the above-identified patent and that said Letters Patent is hereby corrected as shown below:

On title page, column 2, References Cited under other publications, line 3, delete "AppacheActionMQ," and insert -- Apache ActiveMQ, --, therefor.

On title page, column 2, under Abstract, line 4, after "also" delete "are".

In the drawings,

On sheet 3 of 5, in Figure 3, under reference numeral 305, line 1, delete " until " and insert -- until --, therefor.

In the specification,

In column 2, line 20, after "also" delete "are".

In column 2, line 59, delete "(Queue 1)." and insert -- (Queue1). --, therefor.

In the claims,

In column 10, line 60, in claim 3, delete "objected" and insert -- object --, therefor.

Signed and Sealed this  
Seventeenth Day of November, 2015

Michelle K. Lee  
*Director of the United States Patent and Trademark Office*